United States Patent
Sandstrom et al.

(10) Patent No.: US 6,765,063 B2
(45) Date of Patent: *Jul. 20, 2004

(54) PNEUMATIC TIRE HAVING AN INNERLINER OF A RUBBER COMPOSITION WHICH CONTAINS A LOW MOLECULAR WEIGHT TRANS 1,4-POLYBUTADIENE RUBBER

(75) Inventors: Paul Harry Sandstrom, Cuyahoga Falls, OH (US); Wen-Liane Hsu, Cuyahoga Falls, OH (US); Roger Neil Beers, Uniontown, OH (US); Adel Farhan Halasa, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/207,563

(22) Filed: Jul. 29, 2002

(65) Prior Publication Data

US 2004/0016493 A1 Jan. 29, 2004

(51) Int. Cl.$^7$ .................. C08L 27/00; C08L 27/04; C08L 33/14; C08L 9/00
(52) U.S. Cl. .............. 525/191; 525/213; 525/232; 525/238; 525/241
(58) Field of Search .................. 525/191, 213, 525/232, 238, 241

(56) References Cited

U.S. PATENT DOCUMENTS 5,988,248 A * 11/1999 Sandstrom .................. 152/524
6,024,146 A    2/2000 Sandstrom et al. ......... 152/510

* cited by examiner

Primary Examiner—Nathan M. Nutter

(57) ABSTRACT

The present invention relates to a pneumatic rubber tire having an integral innerliner of a rubber composition comprised of butyl rubber and/or halogenated butyl rubber and low molecular weight trans 1,4-polybutadiene rubber, wherein said rubber composition may also contain a minor amount of at least one additional, sulfur curable, elastomer.

9 Claims, No Drawings

PNEUMATIC TIRE HAVING AN INNERLINER OF A RUBBER COMPOSITION WHICH CONTAINS A LOW MOLECULAR WEIGHT TRANS 1,4-POLYBUTADIENE RUBBER

The present invention relates to a pneumatic rubber tire having an integral innerliner of a rubber composition comprised of butyl rubber and/or halogenated butyl rubber and low molecular weight trans 1,4-polybutadiene rubber, wherein said rubber composition may also contain a minor amount of at least one additional, sulfur curable, elastomer.

BACKGROUND OF THE INVENTION

U.S. Pat. No. 6,024,146 relates to a tire having an integral innerliner comprised of bromobutyl rubber, trans 1,4-polybutadiene rubber and, optionally, a minor amount of sulfur curable rubber.

Although the trans 1,4-polybutadiene rubber in U.S. Pat. No. 6,024,146 is broadly referred to, the specification specifically describes a high molecular weight trans 1,4-polybutadiene rubber having a preferable number average molecular weight value (Mn) measured by GPC (gel permeation chromatograph analysis) of greater than 130,000, although its first claim does not contain a molecular weight restriction. The specification observes that use of the high molecular weight trans 1,4-polybutadiene rubber in the tire innerliner rubber composition beneficially increases the green strength of the innerliner composition. Preparation of the trans 1,4-polybutadiene is recited as being prepared by batch polymerizing 1,3-butadiene in an organic solvent in the presence of cobalt octoate and triethyl aluminum as a catalyst system with a para alkyl substituted phenol as a catalyst modifier.

For this invention, a low molecular weight trans 1,4-polybutadiene rubber is prescribed having a number average molecular weight value (Mn) measured by GPC in a range of from 10,000 to 50,000 which is spaced apart from said high molecular weight trans 1,4-polybutadiene described in U.S. Pat. No. 6,024,146 by at least 80,000 molecular weight units and is thereby a significant and substantial departure from use of the aforesaid high molecular weight trans 1,4-polybutadiene rubber.

The low molecular weight trans 1,4-polybutadiene rubber for this invention may be prepared by polymerizing 1,3-butadiene monomer in an organic solvent (e.g. hexane) with a combination of triethylaluminum, barium thymolate and n-butyllithium (n-BuLi) as a catalyst complex system instead of the cobalt octoate and triethylaluminum based catalyst system utilized in said U.S. Pat. No. 6,024,146.

Historically, the inner surface of a pneumatic tire is typically comprised of a layer of a rubber composition designed to prevent or retard the permeation of air and moisture into the carcass from the tire's inner air chamber. It is often referred to as an innerliner. Innerliners have also been used for many years in tubeless pneumatic vehicle tires to retard or prevent the escape of air used to inflate the tire, thereby maintaining tire pressure. Rubbers, such as butyl rubber and halogenated butyl rubber, often referred to as halobutyl rubber, as well as blends thereof, are often used for such tire innerliners which are relatively impermeable to air.

Historically, the tire innerliner itself is normally prepared by conventional calendering or milling techniques to form a strip of uncured rubber composition of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

The use of the prescribed low molecular weight trans 1,4-polybutadiene rubber for this invention is considered herein to be significant to reduce cost of an associated rubber composition for a tire innerliner where a portion of halobutyl rubber content is replaced, while significantly maintaining a low strain stiffness property and providing a desirable low air permeability. This is considered herein to be significant because, in contrast, while a relatively high molecular weight cis 1,4-polybutadiene rubber would be expected to similarly reduce rubber innerliner rubber composition cost, such higher molecular weight polybutadiene would be more difficult to process because of its higher Mooney viscosity and would have a much higher air permeability property.

In the description of this invention, the term "phr" means parts by weight of an ingredient per 100 parts by weight of elastomer in a rubber composition unless otherwise indicated. The terms "rubber" and "elastomer" are used interchangeably unless otherwise indicated. The terms "cure" and "vulcanize" are used interchangeably unless otherwise indicated. The terms "rubber composition" and "rubber compound" are used interchangeably unless otherwise indicated.

SUMMARY AND PRACTICE OF THE INVENTION

In accordance with this invention a tire is provided having an innerliner rubber composition comprised of, based upon 100 parts of rubber (phr);

(A) from about 70 to about 98 phr of rubber selected from the group consisting of butyl rubber, chlorobutyl rubber, bromobutyl rubber and mixtures thereof;

(B) about 2 to 30 phr of a trans 1,4-polybutadiene rubber having a number average molecular weight (Mn) (as measured by GPC, or gel permeation chromatograph) of not greater than 50,000 and desirably in a range of from about 10,000 to about 50,000, a trans 1,4-content in a range of about 80 to about 85 percent, and a vinyl content of less than 5 percent;

(C) from zero to 30, alternatively from about 5 to about 15, phr of at least one elastomer selected from acrylonitrile/butadiene copolymer, styrene/butadiene copolymer, cis 1,4-polyisoprene natural and/or synthetic rubber and mixtures thereof.

A significant aspect of utilization of a low molecular weight trans 1,4-polybutadiene for the tire innerliner of this invention is improved processing with a substantially maintained low strain stiffness with a relatively small increase in air permeability.

While the trans 1,4-polybutadiene of aforesaid U.S. Pat. No. 6,024,146 is of a relatively high crystallinity, a significant aspect of this invention is the use of a low molecular weight trans 1,4-polybutadiene also of relatively high crystallinity to obtain the aforesaid rubber composition processing, physical property(ies) and suitable air permeability.

This is in contrast with using a low molecular weight trans 1,4-polybutadiene of relatively low or no crystallinity which would have much higher air permeability.

Thus a significant aspect of this invention is the combination of both low molecular weight and high crystallinity for the trans 1,4-polybutadiene for the tire innerliner rubber composition A significance of relatively high crystallinity of the low molecular weight trans 1,4-polybutadiene is considered herein as being advantageous for maintaining low air permeability and low strain cured stiffness while providing improved processing.

The relatively high crystallinity aspect of the low molecular weight trans 1,4-polybutadiene, as measured by differential scanning calorimeter (DSC) at a heating rate of 10° C. per minute, is evidenced by two relatively sharp melting point peaks, namely a first peak at about 36° C. (about 30° C. to about 40° C.) and a second peak at about 44° C. (about 40° C. to about 50° C.). It also has a Tg (glass transition temperature determined at a temperature rise of about 10° C.) of about −91° C. In contrast, the high molecular weight trans 1,4-polybutadiene has two melting point peaks with a first peak in a the range of 35° C. to about 45° C. and a second peak in a range of about 55° C. to about 65° C.

In general, the low molecular weight trans 1,4-polybutadiene polymer has a microstructure composed of a trans 1,4-content in a range of about 80 to about 85 percent, a vinyl 1,2-content in a range of about 2 to about 5 percent with the remainder being primarily of a cis 1,4-content in contrast to a vinyl content value of from 5 to 20 weight percent and a cis 1,4-content of from 2 to 15 weight percent of the high molecular weigh trans 1,4-polybutadiene polymer prescribed by U.S. Pat. No. 6,024,146.

Other than the presence of the required low molecular weight trans 1,4-polybutadiene, the remaining rubber components in the rubber compound for use as an innerliner may vary depending on the desired properties for the tire innerliner. For example, based on 100 parts by weight of total rubber, from about 70 to 98 phr is a "butyl-type" rubber selected from the group consisting of butyl rubber, chlorobutyl rubber, bromobutyl rubber and mixtures thereof may be used. Desirably, the amount of "butyl-type" rubber may range from about 85 to 95 phr. Usually, the desired "butyl-type" rubber is brominated butyl rubber as bromobutyl rubber. In addition to the butyl type rubber, the rubber composition may contain from about zero to 30, alternately about 0 to about 15 phr of a non-butyl type, sulfur curable, elastomer selected from at least one of acrylonitrile/butadiene copolymer, styrene/butadiene copolymer, natural rubber and mixtures thereof A desirability of using a non-butyl type, sulfur curable, elastomer may vary, depending somewhat on the relative cost of the elastomer and the cured properties desired. A desirable non-butyl type rubber is considered herein to be an acrylonitrile/butadiene copolymer.

Butyl rubber is conventionally described as a copolymer of isobutylene and isoprene wherein the copolymer contains from about 2 to about 6 weight percent units derived from isoprene (and thus from about 94 to about 99 weight percent units derived from isobutylene). A halobutyl rubber is a butyl rubber which has been halogenated, usually with bromine or chlorine. Thus such halobutyl rubber is typically either bromobutyl rubber or chlorobutyl rubber. Such butyl rubber and halobutyl rubber are well known to those having skill in such art.

The rubber compound containing the low molecular weight trans 1,4-polybutadiene may be prepared by blending with various conventional rubber compounding ingredients, depending somewhat upon innerliner properties desired. Conventional ingredients commonly used in rubber vulcanizates are, for example, carbon black, tackifier resins, processing aids, talc, clay, mica, silica, antioxidants, antiozonants, stearic acid, activators, waxes, oils and peptizing agents. As known to those skilled in the art, depending on the intended use of the sulfur vulcanized rubber, certain additives mentioned above are commonly used in conventional amounts. Typical additions of carbon black comprise from about 10 to 100 parts by weight based on 100 parts by weight of rubber (phr), preferably 40 to 70 phr. Typical amounts of talc, clay, mica, silica and calcium carbonate may range from about 2 to 25 phr. Typical amounts of tackifier resins comprise about 2 to 10 phr. Typical amounts of processing aids comprise about 1 to 15 phr. Typical amounts of antioxidant comprise 1 to 5 phr. Typical amounts of stearic acid comprise 0.50 to about 2 phr. Typical amounts of zinc oxide comprise 1 to 5 phr. Typical amounts of oils comprise 2 to 30 phr. The presence and relative amounts of the above additives are not an aspect of the present invention.

The vulcanization of the compound for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. As known to those skilled in the art, sulfur vulcanizing agents are used in an amount ranging from about 0.2 to 5.0 phr with a range of from about 0.5 to 3.0 being preferred.

Accelerators are used to control the time and/or temperature required for vulcanization and to improve the properties of the vulcanizate. A single accelerator system may be used, i.e., primary accelerator in conventional amounts ranging from about 0.5 to 3.0 phr. In the alternative, combinations of 2 or more accelerators may be used which may consist of a primary accelerator which is generally used in the larger amount (0.3 to 3.0 phr), and a secondary accelerator which is generally used in smaller amounts (0.05 to 10 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide.

In practice the rubber compound is formed into a gum strip. As known to those skilled in the art, a gum strip is produced by a press or passing a rubber compound through a mill, calender, multi-head extruder or other suitable means. Preferably, the gum strip is produced by a calender because greater uniformity is believed to be provided. The uncured gum strip is then constructed as an inner surface (exposed inside surface) of an uncured rubber tire structure, also known as the carcass. The innerliner is then sulfur co-cured with the tire carcass during the tire curing operation under conditions of heat and pressure. The innerliner rubber gum strip may have a thickness, for example, in a range of about 0.04 to about 0.4 centimeters, depending somewhat upon the particular associated tire.

Vulcanization of the tire of the present invention is generally carried out at temperatures of between about 100° C. and 200° C. Usually the vulcanization is conducted at temperatures ranging from about 110° C. to 180° C. Any of the usual vulcanization processes may be used such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being co-cured therewith. The innerliner of the present invention, as mentioned above, may have an uncured gum thickness in the range of from about 0.04 to 0.4 centimeters. Preferably, the innerliner has an uncured gum thickness in the range of from about 0.08 to about 0.20 centimeters for passenger tires, although the innerliner can be considerably thicker for truck tire. For example, as a cured innerliner, the innerliner may have a thickness ranging from about 0.02 to about 0.35 centimeters with an innerliner thickness in a range of about 0.04 to about 0.15 cm for passenger tires and considerably thicker for truck tire and light truck tire applications.

The pneumatic tire with the integral innerliner may be constructed in the form of a passenger tire, truck tire, or other type of bias or radial pneumatic tire.

The following examples are presented in order to illustrate but not limit the present invention. The parts and percentages are by weight unless otherwise noted.

EXAMPLE I

Preparation of Low Molecular Weight, Trans 1,4-Polybutadiene Polymer

For this experiment, 2000 grams of a silica/alumina/molecular sieve dried premix of 1,3-butadiene monomer and hexane composed of 20 weight percent 1,3-butadiene, based upon the total mixture, was charged into a one-gallon (3.8 liters) reactor which contained a water-cooling coil. Then, 20.9 milliliters (ml) of a 0.87 Molar solution of triethylaluminum (TEA), 10 ml of a 0.2 Molar solution of barium thymolate (BAT) in ethylbenzene and 12.6 ml of a 1.6 Molar solution of n-butyllithium (n-BuLi), in which the solvent has hexane, were added to the reactor. The molar ratio of BAT to TEA and to n-BuLi was 0.5/4.5/5.

The polymerization was carried out at a temperature of about 65° C. for a period of about 4 hours. A gas chromatograph (GC) analysis of the residual monomer contained in the polymerization mixture indicated that about 90 percent of the 1,3-butadiene monomer was consumed by the polymerization process, indicating about a 90 percent conversion of the monomer to the resulting polymer. The polymerization was continued for a period of about an additional 60 minutes and then, 5 ml of a 3 Molar ethanol solution in hexane was added to shortstop the polymerization and polymer was removed from the reactor and stabilized with 1 phm of antioxidant. After evaporating the hexane solvent, resulting polymer was dried in a vacuum oven at about 50° C.

The resulting polybutadiene polymer was determined to have a glass transition temperature (Tg) of about −91° C. and two sharp melting temperatures (Tm) at about 36° C. and about 44° C. The Tg and Tm were conducted by a differential scanning calorimeter (DSC) at a temperature rise of about 10° C. per minute. The microstructure of the polybutadiene polymer was determined to be composed of 3.1 percent vinyl 1,2-polybutadiene units, 13.3 percent cis-1,4-polybutadiene units, and 83.6 percent trans-1,4-polybutadiene units The relatively low number average (Mn) and weight average (Mw) molecular weights of the high trans polybutadiene polymer were determined by gel permeation chromatograph (GPC) analysis to be 29,560 and 30,970, respectively and therefore a heterogeneity index (Mw/Mn) of 1.05 which is indicative of a narrow molecular weight distribution.

EXAMPLE II

Preparation of Rubber Compositions

Samples of sulfur cured rubber compounds were prepared and tested. Table 1 identifies various ingredients for each of the samples. Sample A was a Control Sample and Samples B, C and D represent an embodiment of the present invention.

TABLE 1

|  | Control Sample A | Sample B | Sample C | Sample D |
|---|---|---|---|---|
| First Non-Productive Mixing (150° C.) | | | | |
| Bromobutyl rubber[1] | 90 | 90 | 80 | 70 |
| Butyl rubber[2] | 10 | 0 | 0 | 0 |
| Low molecular weight trans 1,4-polybutadiene[3] | 0 | 10 | 20 | 30 |
| Carbon black[4] | 60 | 60 | 60 | 60 |
| Oil/processing aids[5] | 15 | 15 | 15 | 15 |
| Tackifier[7] | 2 | 2 | 2 | 2 |
| Stearic acid | 0.5 | 0.5 | 0.5 | 0.5 |
| Zinc oxide | 1 | 1 | 1 | 1 |
| Productive Mixing Step (100° C.) | | | | |
| Accelerator(s)[8] | 1.5 | 1.5 | 1.5 | 1.5 |
| Sulfur | 0.5 | 0.5 | 0.5 | 0.5 |

[1]Obtained as Bromobutyl 2222 from the ExxonMobil Corporation
[2]Obtained as Butyl 268 from the ExxonMobil Corporation
[3]Low molecular weight trans 1,4-polybutadiene prepared according to Example I
[4]N660, an ASTM designation
[5]Mixture of Flexon 641 from ExxonMobil Corporation and Strucktol 40NS, from Struktol Company
[6]Of the phenolic type
[7]Of the sulfenamide and thuiram type The rubber compositions were prepared by mixing the respective ingredients as a two-step mixing process, namely by a first non-productive mixing step followed by a productive mixing step in which sulfur and accelerator(s) were added, all separate mixing steps in an internal rubber mixer. The first non-productive mixing stage was conducted for about 4 minutes to temperature of about 150° C. after which the mixture was dumped from the mixer and allowed to cool to less than about 40° C. The following productive mixing stage was conducted for about 2 minutes to a temperature of about 100° C. The Samples were cured in a suitable mold for about 30 minutes at a temperature of about 150° C.

Various (cured and uncured) properties of the Samples are reported in the following Table 2.

TABLE 2

|  | Control Sample A | Sample B | Sample C | Sample D |
|---|---|---|---|---|
| Rheometer 150° C. | | | | |
| Maximum torque | 6.2 | 7.2 | 47.2 | 6.2 |
| Minimum torque | 1.7 | 1.7 | 1.6 | 1.4 |
| Delta torque | 4.5 | 5.5 | 5.6 | 4.8 |
| T25 (min.) | 6.4 | 7.2 | 8.2 | 8.8 |
| T90 (min.) | 19.2 | 26.8 | 34.6 | 40.9 |
| Stress-strain | | | | |
| Tensile (MPa) | 8.6 | 8 | 6.9 | 5.5 |
| Elongation (%) | 723 | 637 | 584 | 510 |
| 100% modulus (MPa) | 1 | 1.3 | 1.3 | 1.4 |
| 300% modulus (MPa) | 3.5 | 4 | 4 | 3.9 |
| Hardness, Shore A (23° C.) | 54 | 62 | 64 | 67 |
| Green strength at 120% (MPa) | 0.32 | 0.39 | 0.34 | 0.45 |
| Peel adhesion, 95° C. to self (N) | 119 | 96 | 20 | 3 |
| Air permeability (cc-mil) | 52 | 75 | 99 | 139 |

TABLE 2-continued

|  | Control Sample A | Sample B | Sample C | Sample D |
|---|---|---|---|---|
| Uncured G', 15%, .83 Hz, 100° C., kPa | 175 | 163 | 144 | 118 |
| Cured G", 10%, 1 Hz, 100° C., kPa | 550 | 664 | 672 | 604 |

Cure properties were determined using a Monsanto oscillating disc rheometer which was operated at a temperature of 150° C. and at a frequency of 11 hertz. A description of oscillating disc rheometers can be found in the *Vanderbilt Rubber Handbook* edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of the *Vanderbilt Rubber Handbook*.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained from the rubber stocks that were prepared. These properties include a torque minimum (Minimum torque), a torque maximum (Maximum torque), minutes to 25 percent of the torque increase (T25), minutes to 90 percent of the torque increase (T90) and difference between the maximum torque and minimum torque (delta torque).

Shore hardness was determined in accordance with ASTM D-1415.

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during curing and subsequent testing.

Green strength was determined by ASTM D-412. Air permeability was determined by ASTM D-1434.

It can be seen from Table 2 that the addition of 10 to 30 phr of the low molecular weight trans 1,4-polybutdiene reduced the uncured G' property which will improve mixing processing of butyl based compounds which contain the polybutadiene, whereas the green strength is increased which will provided better calendering behavior. Air permeability at 10 phr show a slight increase, whereas higher levels, 20 and 30 phr, show a more significant increase. A comparison of high cis 1,4-polybutadiene rubber (BUD 1207 from the Goodyear Tire & Rubber Company) at 30 phr shows an air permeability value of 234.

EXAMPLE III

The following Table 3 is presented to demonstrate a relative comparison of expected physical properties of a tire innerliner rubber composition comprised of butyl rubber (a control rubber composition) as compared to an innerliner rubber compositions comprised of 100 parts by weight of butyl rubber and from 2 to 30 parts by weight of high or low molecular weight trans 1,4-polybutadiene and with and without crystallinity. Such properties include a comparison of expected relative processability, green strength, resistance to air permeability and cured stiffness.

The indicated comparative rubber compositions in Table 3 are intended to be comprised of butyl rubber and the aforesaid small amounts of as various trans 1,4-polybutadienes (TPBD), namely high and low molecular weight TPBD's which may or may not be crystalline in nature.

TABLE 3

|  | Processing[2] | Air Green[3] Strength | Permeability Resistance[4] | Cured Stiffness |
|---|---|---|---|---|
| High molecular weight TPBD/crystalline[1] | Poor | Good | Good | Good |
| Low molecular weight TPBD/crystalline[1] | Improved | Good | Good | Good |
| Low molecular weight TPBD/non-crystalline[1] | Improved | Poor | Poor | Poor |

[1]TPBD is an abbreviation for trans-1,4-polybutadiene
[2]Viscosity related mixing processability of the rubber composition where "poor" is indicative of expected higher processing viscosity and "improved" is indicative of expected lower processing viscosity than a butyl rubber control.
[3]Green strength of the rubber composition is rated as "good" for expected increased green strength and "poor" for expected lower green strength, as compared to a butyl rubber control.
[4]Resistance to air permeability is rated as being "good" for expected maintained or only a slight reduction in air permeability and "poor" for expected significant increase of air permeability From Table 3, it can readily be seen that the rubber composition comprised of butyl rubber and a small amount of low molecular weight trans 1,4-polybutadiene has an expected comparative improved processability, good green strength, and acceptable reduction in air permeability.

While certain representative embodiments and details have been shown for the purpose of illustrating the invention, it will be apparent to those skilled in this art that various changes and modifications may be made therein without departing from the spirit or scope of the invention.

What is claimed is:

1. A tire having an innerliner of a rubber composition comprised of, based upon 100 parts of rubber (phr);
   (A) from about 85 to about 95 phr of rubber selected from the group consisting of butyl rubber, butyl rubber halogenated with chlorine, butyl rubber halogenated with bromine and mixtures thereof;
   (B) about 5 to about 15 phr of a trans 1,4-polybutadiene rubber having a number average molecular weight (Mn) in a range of from about 10,000 to about 50,000, a trans 1,4-content in a range of about 80 to about 85 percent, and a vinyl content of less than 5 percent and wherein said trans 1,4-polybutadiene has two melting point peaks, with a first peak in a range of about 30° C. to about 40° C. and a second peak in a range of about 40° C. to about 50° C., as determined by differential scanning calorimeter;
   (C) from zero to 30 phr of an additional elastomer selected from acrylonitrile/butadiene copolymer, styrene/butadiene copolymer, cis 1,4-polyisoprene natural and/or synthetic rubber and mixtures thereof.

2. The tire of claim 1 wherein said butyl rubber is a copolymer of isobutylene and from about 2 to about 6 weight percent units derived from isoprene.

3. The tire of claim 1 wherein said rubber is said butyl rubber halogenated with bromine.

4. The tire of claim 1 wherein said innerliner contains from about 5 to about 15 of at least one of said additional elastomers.

5. The tire of claim 4 wherein said additional elastomer is an acrylonitrile/butadiene copolymer.

6. The tire of claim 2 wherein said innerliner contains from about 5 to about 15 phr of at least one of said additional elastomers.

7. The tire of claim 6 wherein said additional elastomer is an acrylonitrile/butadiene copolymer.

8. The tire of claim 3 wherein said innerliner contains from about 5 to about 15 phr of at least one of said additional elastomers.

9. The tire of claim 8 wherein said additional elastomer is an acrylonitrile/butadiene copolymer.

* * * * *